(12) United States Patent
Savstrup Marstrand et al.

(10) Patent No.: US 11,980,856 B2
(45) Date of Patent: May 14, 2024

(54) FLUID HANDLING APPARATUS AND FLUID TANK SYSTEM

(71) Applicant: ALFA LAVAL CORPORATE AB, Lund (SE)

(72) Inventors: Christian Savstrup Marstrand, Skovlunde (DK); Henrik Falster Hansen, Tølløse (DK); Denis Martin, Rødovre (DK); Alyce Hartvigsen, Allerød (DK)

(73) Assignee: ALFA LAVAL CORPORATE AB, Lund (SE)

( * ) Notice: Subject to any disclaimer, the term of this patent is extended or adjusted under 35 U.S.C. 154(b) by 117 days.

(21) Appl. No.: 17/401,882

(22) Filed: Aug. 13, 2021

(65) Prior Publication Data

US 2021/0370245 A1  Dec. 2, 2021

Related U.S. Application Data

(62) Division of application No. 15/628,913, filed on Jun. 21, 2017, now Pat. No. 11,123,698.

(51) Int. Cl.
*B01F 25/51* (2022.01)
*B01F 25/21* (2022.01)
(Continued)

(52) U.S. Cl.
CPC .......... *B01F 25/51* (2022.01); *B01F 25/2122* (2022.01); *B01F 25/31113* (2022.01);
(Continued)

(58) Field of Classification Search
CPC ............ B01F 25/2122; B01F 25/31113; B01F 25/53; B01F 2101/15; B01F 2215/044;
(Continued)

(56) References Cited

U.S. PATENT DOCUMENTS 923,571 A    6/1909  Paterson
1,073,878 A  9/1913  Trent
(Continued)

FOREIGN PATENT DOCUMENTS

CN    1482942 A    3/2004
CN    1509203 A    6/2004
(Continued)

OTHER PUBLICATIONS

An English Translation of the Office Action and Search Report dated May 15, 2020, by the Russian Patent Office in corresponding Russian Patent Application No. 2020101998/05(002910). (7 pages).
(Continued)

*Primary Examiner* — Dana Ross
*Assistant Examiner* — James F Sims, III
(74) *Attorney, Agent, or Firm* — BUCHANAN INGERSOLL & ROONEY PC (57) ABSTRACT

A fluid handling apparatus for ejecting fluid into a tank and draining fluid from the tank comprises: a fluid duct for draining/supplying fluid from/to the tank, the fluid duct configured for fluid communication with a tank opening at a tank bottom; a fluid inlet pipe for supplying fluid to the tank, the fluid inlet pipe extending at least partly through the fluid duct and configured to extend through the tank opening into the tank; a rotary fluid ejection device in fluid communication with the fluid inlet pipe; and a rotary drive shaft extending at least partly inside the fluid inlet pipe, the rotary drive shaft being rotatably connected to the rotary fluid ejection device. Also disclosed is a fluid tank system comprising a tank and a fluid handling apparatus, and a method for mixing beer or wort with solid hops material in a tank by a fluid handling apparatus.

18 Claims, 6 Drawing Sheets

(51) Int. Cl.
  *B01F 25/31* (2022.01)
  *B01F 25/53* (2022.01)
  *B01F 25/54* (2022.01)
  *B01F 35/10* (2022.01)
  *B01F 101/15* (2022.01)
  *B08B 9/093* (2006.01)
  *C12C 11/00* (2006.01)

(52) U.S. Cl.
  CPC .............. *B01F 25/53* (2022.01); *B01F 25/54* (2022.01); *B01F 35/1452* (2022.01); *B08B 9/0936* (2013.01); *B01F 2101/15* (2022.01); *B01F 2215/044* (2013.01); *C12C 11/00* (2013.01)

(58) Field of Classification Search
  CPC ...... B01F 25/51; B01F 25/54; B01F 35/1452; B08B 9/0936; C12C 11/00
  USPC .......................................................... 99/276
  See application file for complete search history.

(56) References Cited

U.S. PATENT DOCUMENTS

| | | |
|---|---|---|
| 3,121,536 A | 2/1964 | Mckibben |
| 3,825,022 A | 7/1974 | Metz |
| 4,332,484 A | 6/1982 | Peters |
| 5,460,331 A | 10/1995 | Krajicek et al. |
| 5,642,746 A | 7/1997 | Sayce |
| 5,899,560 A | 5/1999 | Byers |
| 7,059,759 B2 | 6/2006 | Hummer |
| 8,118,477 B2 | 2/2012 | Lamon |
| 8,790,001 B2 | 7/2014 | Lamon |
| 9,334,471 B2 | 5/2016 | Michel et al. |
| 2002/0172092 A1 | 11/2002 | Reeder et al. |
| 2003/0137895 A1 | 7/2003 | Hummer |
| 2007/0263481 A1 | 11/2007 | Whitney et al. |
| 2008/0067719 A1 | 3/2008 | Schlummer et al. |
| 2013/0139892 A1 | 6/2013 | Spelten et al. |
| 2013/0224358 A1* | 8/2013 | Michel .................... C12C 13/00 366/137 |
| 2014/0137897 A1 | 5/2014 | Falster-hansen |
| 2018/0369764 A1 | 12/2018 | Savstrup Marstrand et al. |

FOREIGN PATENT DOCUMENTS

| | | |
|---|---|---|
| CN | 203208926 U | 9/2013 |
| CN | 103619456 A | 3/2014 |
| DE | 2307609 A1 | 9/1974 |
| DE | 69822131 T2 | 3/2005 |
| EA | 025585 B1 | 1/2017 |
| EP | 2540386 A1 | 1/2013 |
| RU | 1788910 A3 | 1/1993 |
| RU | 2006274 C1 | 1/1994 |
| RU | 2437757 C2 | 12/2011 |
| WO | 9736697 A1 | 10/1997 |
| WO | 2001053191 A2 | 7/2001 |

OTHER PUBLICATIONS

Office Action (First Office Action) dated Jun. 4, 2021, by the National Intellectual Property Administration, P. R. China in corresponding Chinese Patent Application No. 201880041415.X and an English Translation of the Office Action. (31 pages).

* cited by examiner

FLUID HANDLING APPARATUS AND FLUID TANK SYSTEM

CROSS-REFERENCE TO RELATED APPLICATION

This application is a divisional of U.S. patent application Ser. No. 15/628,913 filed Jun. 21, 2017, the entire content of which is incorporated herein by reference.

TECHNICAL FIELD

The present disclosure relates to a fluid handling apparatus for ejecting fluid into a tank and draining fluid from the tank, where the fluid handling apparatus comprises a fluid duct for draining fluid from the tank or for supplying fluid to the tank. The fluid duct is configured for being in fluid communication with a tank opening at a bottom of the tank. A fluid inlet pipe is arranged for supplying fluid to the tank, and a rotary fluid ejection device is in fluid communication with the fluid inlet pipe. The fluid handling apparatus is for example suitable for mixing of fluids within the tank and for cleaning the tank. The disclosure further relates to a fluid tank system and a method for mixing beer or wort with solid hops material in a tank.

BACKGROUND

When mixing a fluid, such as a liquid, with another fluid or with a substance in industrial processes, a fluid handling apparatus designed for the mixing operation is often used. There are many different types of equipment that can be used for the mixing operation, and the equipment used often comprises rotating ejection nozzles arranged on a rotating head housing. The ejection nozzles are used for distributing the flow of fluid into a tank so that the fluid can be mixed with the substance.

In the brewing industry, beer may be produced with a dry hopping process, in which the beer or wort is mixed with hops in the form of hops pellets or whole fresh hops. The hops can be added to the beer by simply dumping the hops into the tank from the top of the tank without mixing. This however results in a non-effective hopping process with a long processing time.

One major disadvantage with the traditional equipment for mixing, where the equipment used comprises rotating ejection nozzles arranged on a rotating head housing, is that the rotating head housing is driven by a turbine, which in turn is driven by the liquid flow. The small clearance inside the equipment is causing that the flow of fluid is blocked when solid material get stuck and swell. In this way the flow of liquid is blocked and the ejection nozzles can stop rotating.

Moreover, traditional fluid handling apparatus with fluid ejection for mixing of fluid and cleaning of the tank also suffers from large and complex fluid pipe installation.

There is thus a need for an improved fluid handling apparatus and system, where these disadvantages can be avoided.

SUMMARY

An object of the present disclosure is to provide a fluid handling apparatus, a fluid tank system, and a method for mixing beer or wort with solid hops material in a tank by means of a fluid handling apparatus, where the previously mentioned problems are avoided. This object is at least partly achieved by the features of the independent claims. The dependent claims contain further developments of the fluid handling apparatus and the fluid tank system.

The disclosure concerns a fluid handling apparatus for ejecting fluid into a tank and draining fluid from the tank, where the fluid handling apparatus comprises: a fluid duct for draining fluid from the tank or for supplying fluid to the tank, wherein the fluid duct is configured for being in fluid communication with a tank opening at a bottom of the tank; a fluid inlet pipe for supplying fluid to the tank, wherein the fluid inlet pipe is extending at least partly through the fluid duct and configured to extend through the tank opening into the tank; a rotary fluid ejection device being in fluid communication with the fluid inlet pipe; and a rotary drive shaft extending at least partly inside the fluid inlet pipe, wherein the rotary drive shaft is rotatably connected to the rotary fluid ejection device.

An advantage with these features is that the fluid handling apparatus can be driven by an external power source, which gives fewer components inside the fluid handling apparatus, and since no fluid powered turbine is used for driving the fluid handling apparatus, more clearance inside the equipment can be achieved. Further, the rotational power can be increased so that solid particles are churned instead of stopping the rotary fluid ejection device.

Moreover, by using the same tank opening for both supplying fluid to the tank and draining fluid from tank the fluid piping installation can be made more compact and less costly. Having the tank opening at the bottom of the tank enables efficient self-draining of fluid from the tank and the fluid piping installation is easily accessible for maintenance work.

According to an aspect of the disclosure, the rotary drive shaft extends at least partly through the fluid duct. With this design, the rotary drive shaft can be arranged inside a part of the fluid duct and further extend into the fluid inlet pipe at one end and to the external power source arranged outside the fluid duct at the other end, giving a compact and efficient design with few components.

According to another aspect of the disclosure, the fluid handling apparatus further comprises an external power source drivingly connected to the rotary drive shaft. The external power source can be an electric motor providing the rotational power, which external power source can give an increased rotational power compared to a turbine arranged inside the equipment and powered by the fluid of the tank. Alternatively, the external power source can be a hydraulic motor, a pneumatic motor, a combustion engine or the like.

According to a further aspect of the disclosure, the fluid inlet pipe is composed of a plurality of individual pipe segments that are detachably interconnected for enabling removal of the fluid inlet pipe from the tank at the bottom of the tank. This construction will provide an efficient way for assembling or removing the fluid inlet pipe from the tank, for example during maintenance or cleaning of the equipment.

According to an aspect of the disclosure, the rotary drive shaft is composed of a plurality of individual drive shaft segments that are detachably interconnected for enabling removal of the rotary drive shaft from the tank at the bottom of the tank. This construction will provide an efficient way for assembling or removing the rotary drive shaft from the tank, for example during maintenance or cleaning of the equipment.

According to another aspect of the disclosure, the rotary drive shaft is coaxial with the fluid inlet pipe. This arrangement of the rotary drive shaft provides a compact solution, where the flow of fluid can be efficiently distributed inside the fluid inlet pipe around the rotary drive shaft. This design also enables maximal clearance between an interior surface of the fluid inlet pipe and exterior surface of the rotary drive shaft.

According to another aspect of the disclosure, the rotary drive shaft extends through a drive shaft hole in a wall of the fluid inlet pipe, or in the wall of a fluid inlet housing in fluid communication with the fluid inlet pipe, at a position configured to be located below the tank, and wherein the fluid handling apparatus comprises a drive shaft seal for sealing the drive shaft hole. The arrangement with the drive shaft hole in the wall of the fluid inlet pipe, or in the wall of the fluid inlet housing, gives a compact construction, since the rotary drive shaft can be connected to the external power source through the drive shaft hole. The drive shaft seal secures that the fluid is not leaking out through the drive shaft hole. The seal may be a mechanical type shaft seal, an O-ring type shaft seal or a magnetic coupling seal arrangement, or the like.

A magnetic coupling seal arrangement involves rotary motion transferred by magnetism while a driving shaft is physically separated from a driven shaft by a barrier wall making the seal entirely impenetrable. A magnetic coupling seal arrangement thus includes a split rotary drive shaft, where a lower part of the rotary drive shaft is drivingly connected to the external power source and an upper part of the rotary drive shaft is drivingly connected to the rotary fluid ejection device.

According to a further aspect of the disclosure, the fluid inlet pipe extends through a pipe hole in the wall of the fluid duct at a position configured to be located below the tank, and wherein the fluid handling apparatus comprises a pipe seal for sealing the pipe hole. The arrangement with the pipe hole in the wall of the fluid duct further contributes to the compact construction, since the fluid inlet pipe can be arranged through the pipe hole. The pipe seal secures that the fluid is not leaking out through the pipe hole.

According to another aspect of the disclosure, the fluid inlet housing is located below the fluid duct, and wherein the fluid inlet pipe extends through the fluid duct. With this arrangement a secure and strong construction can be achieved, where the different components can be firmly connected to each other in a compact format. Moreover, by having the fluid inlet housing and the fluid duct being designed and manufactured as individual separate parts each part can be replaced individually if necessary.

According to an aspect of the disclosure, the fluid handling apparatus further comprises a fluid pump having an inlet port in fluid communication with the fluid duct and an outlet port in fluid communication with the fluid inlet pipe, such that operation of the fluid pump is configured for providing circulation of fluid in the fluid handling apparatus. The fluid pump is securing the flow of liquid into the tank for an efficient mixing of the fluid or for cleaning the tank. The fluid can be circulated with the pump so that the fluid is drained from the tank to the pump. The pump is then distributing the fluid to the rotating ejection nozzles of the rotary fluid ejection device.

According to a further aspect of the disclosure, the fluid handling apparatus is suitable for introduction and/or circulation of solid particles, in particular solid hops material such as hops pellets, into a fluid content of the tank.

According to an aspect of the disclosure, the fluid handling apparatus further comprises a fluid pump having a pump inlet port and a pump outlet port, and a fluid reversing valve arrangement fluidly connected to the pump inlet port, the pump outlet port, the fluid duct and the fluid inlet pipe. The fluid reversing valve arrangement is configured to enable selective flow circulation operation of the fluid handling apparatus in either conventional mixing and/or cleaning mode in which fluid is configured to be ejected into the tank via the rotary fluid ejection device and drained from the tank via the fluid duct, or a reverse mode in which fluid is configured to be sucked out from the tank via the rotary fluid ejection device and supplied to the tank via the fluid duct. A selective flow circulation operation of the fluid handling apparatus in either conventional mixing and/or cleaning mode or a reverse mode has the advantage of enabling efficient declogging of any clogged parts of the fluid handling apparatus.

The disclosure further concerns a fluid tank system comprising a tank and a fluid handling apparatus according to the disclosure above, wherein the fluid duct is in fluid communication with a tank opening at a bottom of the tank, wherein the fluid inlet pipe extends through the tank opening into the tank, and wherein the rotary fluid ejection device is located inside the tank.

According to an aspect of the disclosure, the tank comprises a single tank opening for both inlet and outlet of fluid. In this way a compact system for efficient mixing and cleaning can be achieved, where the fluid handling apparatus is connected to the tank from below the tank at the bottom of the tank.

The disclosure further concerns a method for mixing beer or wort with solid hops material in a tank by means of a fluid handling apparatus, where the method comprises: introducing solid hops material in beer or wort; ejecting beer or wort mixed with solid hops material within the tank by means of rotary fluid ejection device that is connected to a fluid inlet pipe; rotating the rotary fluid ejection device by means of a rotary drive shaft that extends at least partly inside the fluid inlet pipe and that is rotatably connected with the rotary fluid ejection device; draining beer or wort mixed with solid hops material from the tank by means of a fluid duct in fluid communication with a tank opening at a bottom of the tank, wherein the fluid inlet pipe extends at least partly through the fluid duct and through the tank opening into the tank. According to an aspect of the disclosure, the solid hops material is introduced in the beer or wort outside the tank. According to an aspect of the disclosure, the fluid handling apparatus is a fluid handling apparatus according to the disclosure above.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
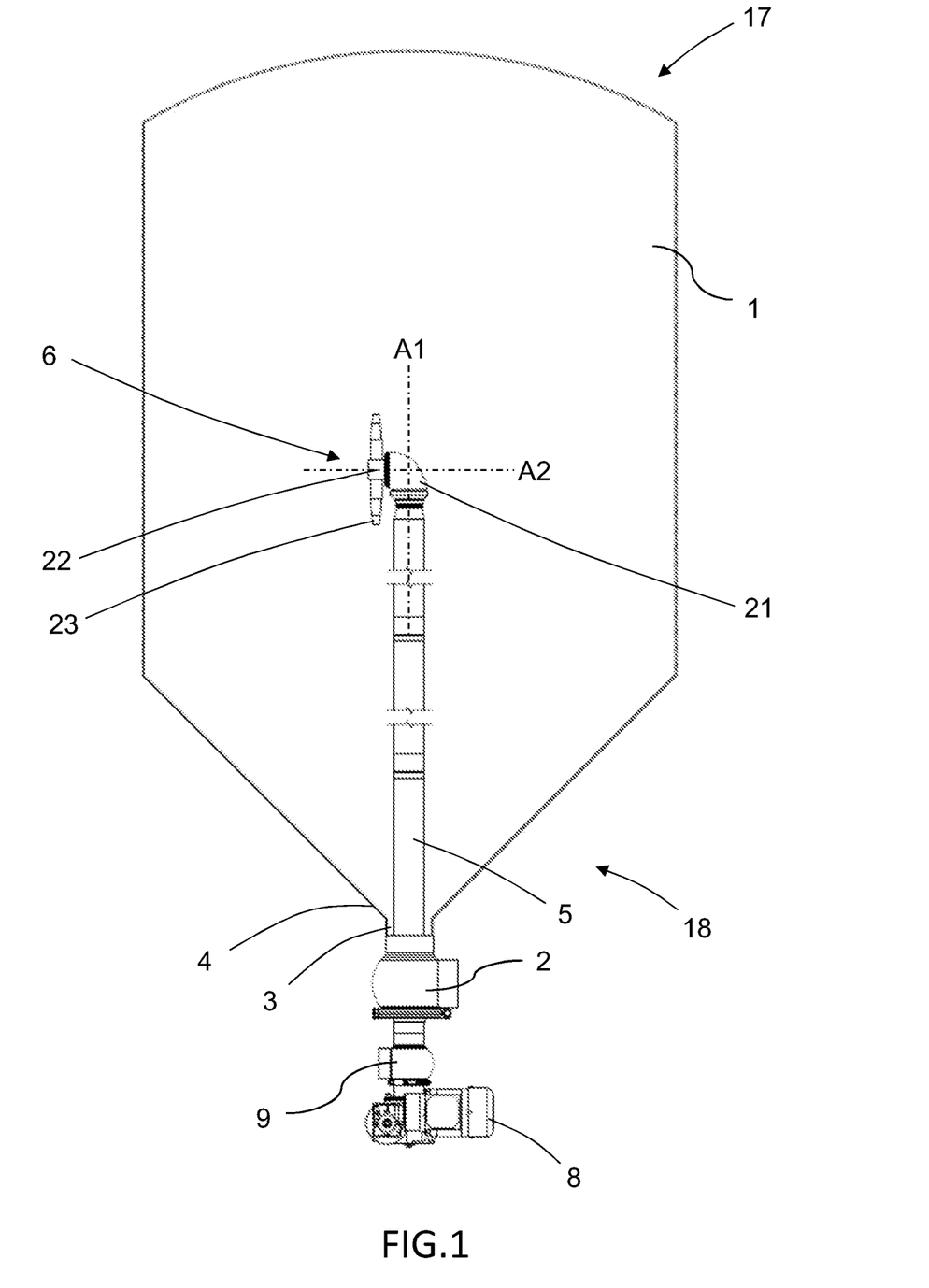
FIG. 1 shows schematically, a fluid handling apparatus according to the disclosure.

FIG. 1 schematically shows a fluid handling apparatus for ejecting fluid into a tank 1 and for draining fluid from the tank 1. The fluid handling apparatus may for example be used for circulation of a fluid contained within the tank 1 and for cleaning of the tank 1.

One situation where fluids need to be circulated is for example in the process of brewing beer, e.g. where wort is mixed with solid hops material such as hops pellets in the tank 1. The hops add bitterness to the beverage and acts as a natural preservative, and the solid hops material such as hops pellets used in the brewing process needs to be thoroughly mixed with the liquid used in the process in order to achieve an efficient process.

The tank 1 may be of any conventional type suitable for holding a fluid, depending on the area of use, such as for example a storage tank, a holding tank or container used in industrial applications. The tank 1 has a container structure that is enclosing an inner volume or space in which the fluid is contained. The tank is provided with an upper part 17 and a lower part 18. The lower part 18 of the tank 1 has a bottom 4 provided with a single tank opening 3 for both inlet and outlet of fluid into and out from the tank 1.

The tank opening 3 can be arranged as a hole in the bottom 4 so that liquids or other fluids can be filled into or drained from the tank 1. The tank 1 may be manufactured from any suitable material, such as for example stainless steel, aluminium, or other metals, plastic materials or composite materials.

Figure 2:
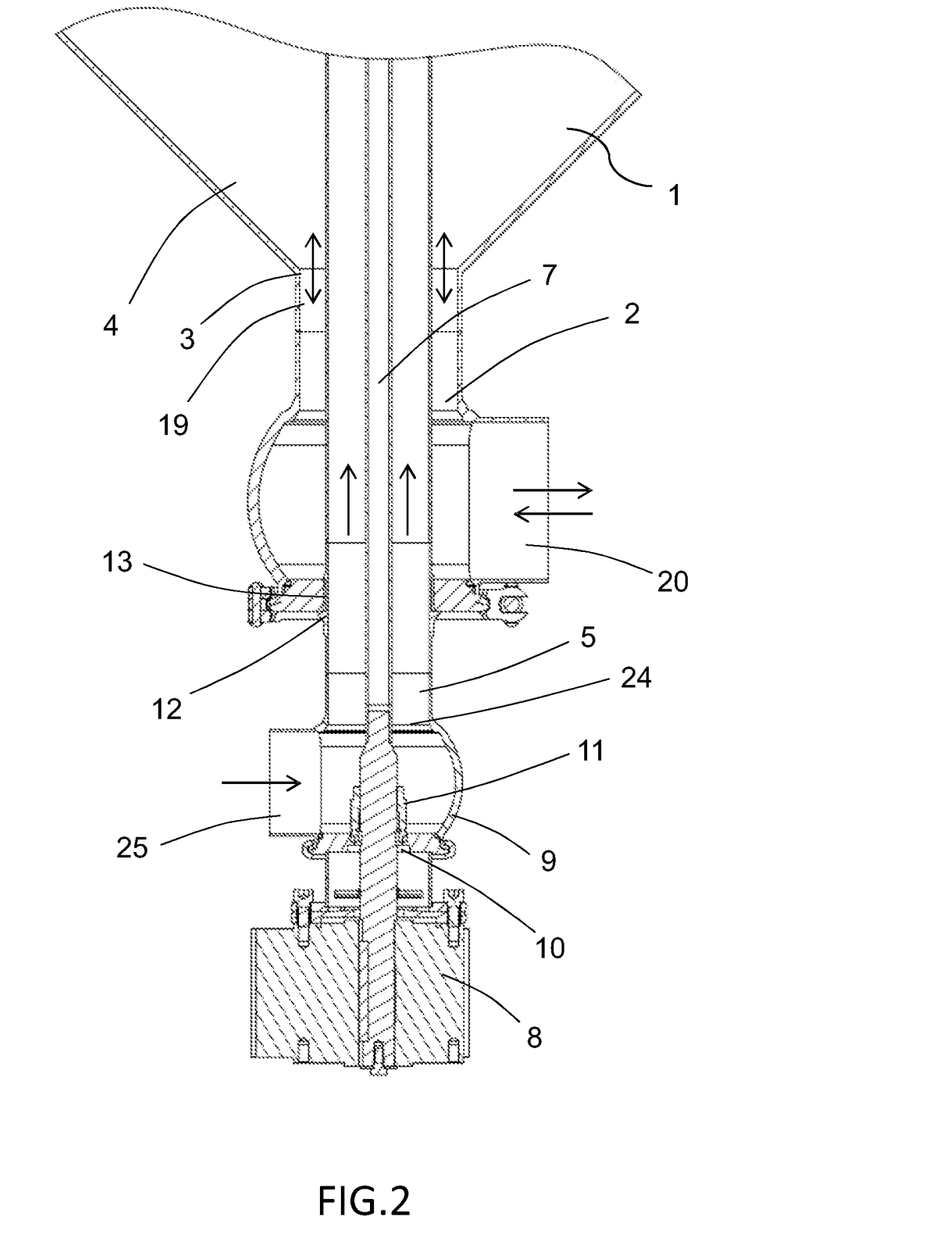
FIG. 2 shows schematically, a cross-section of a lower part of the fluid handling apparatus in FIG. 1 according to the disclosure.

The fluid handling apparatus comprises a fluid duct 2 for draining fluid from the tank 1 or for supplying fluid to the tank 1. The fluid duct 2 is configured for being in fluid communication with the tank opening 3 at the bottom 4 of the tank 1, as schematically shown in FIGS. 1 and 2. The fluid duct 2 can be constructed as a housing unit adapted for being in fluid communication with the tank 1, so that the fluid can be transported into the tank 1 or out from the tank 1.

The fluid duct 2 is provided with a tank port 19 adapted for being connected or attached to the tank opening 3 with suitable connection means. The tank port 19 and the tank opening 3 may be constructed so that the fluid duct 2 can be releasably connected to the tank 1, for example through a flange connection, a threaded connection or similar arrangement. The tank port 19 of the fluid duct 2 is in fluid communication with the inner volume of the tank so that the fluid can flow from outside the tank 1, through the fluid duct 2, and into the inner volume of the tank 1 during a tank filling operation. If the tank 1 is emptied, the fluid can flow from the inner volume of the tank 1, through the fluid duct 2, and further to the outside of the tank 1 during an emptying operation, such as during a circulation or mixing process.

The fluid duct 2 has further an external port 20 that is adapted for being connected to a fluid conduit, such as a pipe or hose, for filling or emptying of the tank 1. The external port 20 may be constructed so that the fluid duct 2 can be releasably connected to the pipe or hose, for example through a threaded connection or similar suitable hose or pipe connection arrangement.

The fluid duct 2 may be constructed as a rigid unit with a housing that is forming a flow channel within the fluid duct 2. A conventional valve housing may for example by used as housing for the fluid duct 2.

As illustrated in FIG. 2, the tank port 19 is arranged at an upper part of the fluid duct 2 connected to the tank opening 3 of the tank 1, so that the fluid can flow in an essentially vertical direction into and out from the tank 1. The external port 20 may be arranged at the lower part of the fluid duct 2 so that the fluid can flow in an angled direction in relation to the flow direction through the tank port 19. As indicated with the arrows in FIG. 2, the flow through the external port 20 may have an essentially horizontal direction through the external port 20 into or out from the fluid duct 2. In this way the flow is changing direction in the fluid duct 2. The flow directions may also be different from the ones described in relation to FIG. 2, and any suitable angles may be chosen depending on the construction of the fluid duct 2. Alternatively, the fluid duct may be attached to the tank 1 in another position than the described in relation to FIG. 2 depending on the construction of the tank 1.

As described above, the fluid duct 2 may be of a rigid construction, which is strong enough to hold the fluid handling apparatus in position in relation to the tank 1. Suitable materials for the housing of the fluid duct 2 are for example stainless steel, brass, bronze, or other suitable metallic materials, composite materials, and plastic materials, or combinations of different materials.

A fluid inlet pipe 5 is supplying fluid to the tank 1. The fluid inlet pipe 5 is extending from outside the tank 1 and into the inner volume of the tank 1, so that the fluid can be supplied to the inner volume of the tank 1 through the fluid inlet pipe 5. The fluid inlet pipe 5 is arranged in relation to the tank 1, as shown in FIG. 2, so that the fluid inlet pipe 5 is extending at least partly through the fluid duct 2. In this way, the fluid inlet pipe 5 is configured to extend through the tank opening 3 into the tank 1.

The housing of the fluid duct 2 is provided with a pipe hole 12, and in the embodiment shown in FIG. 2, the pipe hole 12 is arranged in the housing wall in the lower part of the fluid duct 2. The fluid inlet pipe 5 can thus be inserted into the tank 1 through the pipe hole 12 of the fluid duct 2, so that the fluid inlet pipe 5 is extending into the flow channel of the fluid duct 2 from the pipe hole 12 to the tank port 19. The fluid inlet pipe 5 is thus extending through the pipe hole 12 in the wall of the fluid duct 2 at a position configured to be located below the tank 1.

A suitable tank seal 13 for sealing the pipe hole 12 may be arranged between the housing of the fluid duct 2 and the fluid inlet pipe 5, and the pipe seal 13 prevents that the fluid flowing in the fluid duct 2 is leaking out from the fluid duct 2 through the pipe hole 12. The pipe seal 13 can be made of any suitable material with a desired construction, such as for example a gasket made of rubber or silicone. The fluid inlet pipe 5 will be held in place in relation to the housing of the fluid duct 2 with suitable fastening means so that when the fluid inlet pipe 5 is attached to the fluid duct 2, the fluid inlet pipe 5 is firmly connected to the fluid duct 2.

When the fluid inlet pipe 5 is attached to the fluid duct 2, as shown in FIG. 2, the flow of fluid in the fluid duct 2 will be arranged on the outside of the fluid inlet pipe 5. The fluid inlet pipe 5, the flow channel of the fluid duct 2, and the tank port 19 may for example have a circular cross-sectional shapes, and if the fluid inlet pipe 5 is positioned centrally in the fluid duct 2 through the tank port 19 of the flow around the fluid inlet pipe 5 will be annularly shaped. Other configurations of the fluid inlet pipe 5 in relation to the fluid duct are also possible depending on the design of the fluid inlet pipe 5 and the fluid duct 2.

When the fluid is flowing out from the tank 1 through the fluid duct 2 in the embodiment shown in FIG. 2, the fluid will flow essentially downwards in a vertical direction through the tank port 19, around the part of the fluid inlet pipe 5 that is extending inside the fluid duct 2, and further in an essentially horizontal direction out from the fluid duct 2 through the external port 20. When the fluid is flowing into the tank 1 the flow directions will be the opposite.

As shown in FIG. 1, a rotary fluid ejection device 6 may be in fluid communication with the fluid inlet pipe 5. The rotary fluid ejection device 6 is arranged for distributing the fluid that is flowing through the fluid inlet pipe 5 into the tank 1. A rotary drive shaft 7 is used for driving the rotary fluid ejection device 6. In this way, the fluid duct 2 is in fluid communication with the tank opening 3 at the bottom 4 of the tank 1, where the fluid inlet pipe 5 extends through the tank opening 3 into the tank, and where the rotary fluid ejection device 6 is located inside the tank 1.

The rotary fluid ejection device 6 is arranged as a rotary head with a rotary head housing 21 that is rotatable around a first axis A1, which is essentially parallel to the fluid inlet pipe 5 and the rotary drive shaft 7. A bearing may be arranged between a connection flange on the fluid inlet pipe 5 and an inlet end of the rotary head housing 21 that faces the connection flange, such that the rotary head housing 21 is rotatably arranged relative to the connection flange and the fluid inlet pipe.

The rotary head housing 21 also comprises a rotary hub 22 on which a number of fluid ejection nozzles 23 are arranged. In the embodiment shown in FIG. 1, two ejection nozzles 23 are symmetrically arranged on the rotary hub 22. It may also be possible to have one, three, four, or even more ejections nozzles depending on the design of the fluid handling device. A further bearing may be arranged in between the rotary hub 22 and an outlet end of the rotary head housing 21 that faces the rotary hub 22, such that the rotary hub 22 is rotatable relatively the rotary head housing 21. In this way, the rotary hub 22 can rotate about a second axis A2 that is typically offset from the first axis A1 by an angle of 80-100°. In the embodiment shown in FIG. 1, the second axis A2 is arranged about 90° in relation to the first axis A1. Thus, the rotary hub 22 and the ejection nozzles 23 are able to rotate in a first direction about the first axis A1 together with the rotary head housing 21, and in a second direction about the second axis A2.

The fluid inlet pipe 5 may have the principal shape of a conventional pipe and the fluid inlet pipe 5 is capable of transporting liquid to be ejected into the tank 1. The fluid enters the fluid inlet pipe 5 from outside the tank 1, and the lower part of the fluid inlet pipe 5 may be arranged with a fluid inlet housing 9. The fluid enters the fluid inlet housing 9, and is conveyed into the fluid inlet pipe 5 and towards the rotary head housing 21. The fluid then enters the rotary head housing 21 at the connection to the connection flange and exits the rotary head housing 21 at the connection to the rotary hub 22. The rotary hub 22 receives liquid from the rotary head housing 21 and distributes the fluid further to the ejection nozzles 23, which eject the fluid into the tank 1 such that the fluid streams into a content of the tank or, if the content has been ejected from the tank 1, hits an inner surface of the tank 1.

A rotary drive shaft 7 is extending at least partly inside the fluid inlet pipe 5 and the rotary drive shaft 7 may be rotatably connected to the rotary fluid ejection device 6. Since the rotary drive shaft 7 is extending inside the fluid pipe, the rotary drive shaft 7 also extends at least partly through the fluid duct 2, as shown in FIG. 2. Both the rotary drive shaft 7 and the fluid inlet pipe 5 are configured to extend through the fluid duct 2 in the region of the tank opening 3 at the bottom 4 of the tank 1. The rotary drive shaft 7 may be arranged inside the fluid inlet pipe 5 so that it is coaxial with the fluid inlet pipe 5.

The rotary drive shaft 7 is extending through the fluid inlet pipe 5 to the rotary head housing 21, where it may be connected to the rotary head housing 21. The rotation of the rotary head housing in the first direction about the first axis A1 may be accomplished via the rotary drive shaft 7. The rotary drive shaft 7 has an external diameter that is smaller than both an inner diameter of the fluid inlet pipe 5, an inner diameter of the connection flange and a diameter of an opening at the inlet end of the rotary head housing 21. This allows the fluid to flow past the rotary drive shaft 7. When the rotary drive shaft 7 is rotated, the rotary head housing 21 is rotated in the first direction about the first axis A1. The rotary drive shaft 7 may be arranged in relation to an external power source 8 so that it can rotate in opposite directions about the first axis A1.

The rotary drive shaft 7 is at a lower end connected to the external power source 8, and the external power source 8 is drivingly connected to the rotary drive shaft 7. The external power source 8 may for example be a conventional electrical motor, but other types of motors such as a pneumatic or a hydraulic motor may also be used. When the external power source 8 is activated, it generates a rotation of the rotary drive shaft 7 and thereby a rotation of the rotary head housing 21 in the first direction about the first axis A1.

To accomplish the rotation of the rotary hub 22 and the ejection nozzles 23 in the second direction about the second axis A2, a drive member may be arranged in the rotary head housing 21. The drive member may be arranged so that the rotary hub 22 with the ejection nozzles can rotate in opposite directions about the second axis A2. The drive member may for example be a suitable gearing unit arranged in the rotary head housing 21, which gearing unit is connected to the rotary drive shaft 7 and further to the rotary hub 22, so that the rotary hub 22 is rotated in the second direction about the second axis A2. As an alternative, the ejection nozzles 23 may be arranged on the rotary hub 22 so that the fluid flowing out from the ejection nozzles 23 are propelling the rotary hub 22 in a rotational movement in the second direction about the second axis A2. As a further alternative, the drive member for rotating the rotary hub 22 and the ejection nozzles 23 may be arranged in the form of an impeller inside the rotary head housing 21. A rotation of the impeller is induced by the fluid flow through the rotary head housing 21, from the inlet end to the outlet end of the rotary head housing 21. When the impeller rotates, its rotational movement is used for generating a rotation of the rotary hub 22 in the second direction about the second axis A2. Any suitable technique for arranging the impeller and for transferring a rotational movement of the impeller to the rotary hub 22 may be employed. However, the rotation of the rotary hub 22 and the ejection nozzles 23 is preferably achieved by an external power source, e.g. through a drive member.

As shown in FIG. 2, the lower part of the fluid inlet pipe 5 may be connected to the fluid inlet housing 9, in a position where the fluid inlet housing 9 is located below the fluid duct 2, and where the fluid inlet pipe 5 extends through the fluid duct 2. The fluid inlet housing 9 is configured for being in fluid communication with the fluid inlet pipe 5. The fluid inlet housing 9 can be constructed as a housing unit adapted for being in fluid communication with the fluid inlet pipe 5, so that the fluid can be transported into the fluid inlet pipe 5 from outside the tank 1 via the fluid inlet housing 9, and further conveyed into the fluid inlet pipe 5 towards the rotary head housing 21.

The fluid inlet housing 9 may be provided with a pipe port 24 adapted for being connected or attached to the fluid inlet pipe 5 with suitable connection means. The pipe port 24 and the fluid inlet pipe 5 may be constructed so that the fluid inlet housing 9 can be releasably connected to the fluid inlet pipe 5, for example through a threaded connection or similar arrangement. The pipe port 24 of the fluid inlet housing 9 is in fluid communication with the inner volume of the fluid inlet pipe 5 so that the fluid can flow from outside the fluid handling apparatus, through the fluid inlet housing 2, and into the inner volume of the fluid inlet pipe 5 during a tank filling, tank cleaning, or fluid circulation or mixing operation.

The fluid inlet housing 9 has further an inlet port 25 that is adapted for being connected to a fluid conduit, such as a pipe or hose, for supplying the fluid to the fluid inlet pipe 5. The inlet port 25 may be constructed so that the fluid inlet housing 9 can be releasably connected to the pipe or hose, for example through a threaded connection or similar suitable hose or pipe connection arrangement. The fluid inlet housing 9 may be constructed as a rigid unit with a housing that is forming a flow channel within the fluid inlet housing 9.

As illustrated in FIG. 2, the pipe port 24 is arranged at an upper part of the fluid inlet housing 9 connected to the fluid inlet pipe 5, so that the fluid can flow in an essentially vertical direction into the fluid inlet pipe 5. The inlet port 25 may be arranged so that the fluid can flow in an angled direction in relation to the flow direction through the pipe port 24.

As indicated with the arrow in FIG. 2, the flow through the inlet port 25 may have an essentially horizontal direction through the inlet port 25 into the fluid inlet housing 9. In this way the flow is changing direction in the fluid inlet housing 9. The flow directions may also be different from the ones described in relation to FIG. 2, and any suitable angles may be chosen depending on the construction of the fluid inlet housing 9.

As described above, the fluid inlet housing 9 may be of a rigid construction, which is strong enough to hold the fluid handling apparatus in relation to the fluid inlet pipe 5. The external power source 8 may also, as shown in FIGS. 1 and 2, be connected to the fluid inlet housing 9 with suitable connection means. Materials that may be used for the housing of the fluid inlet housing 9 are for example stainless steel, brass, bronze, or other suitable metallic materials, composite materials, and plastic materials, or combinations of different materials.

The fluid inlet housing 9 is, as shown in FIG. 2, provided with a drive shaft hole 10, and in the embodiment shown in FIG. 2, the drive shaft hole 10 is arranged in the housing wall in the lower part of the fluid inlet housing 9. The rotary drive shaft 7 can in this way be inserted into the fluid inlet pipe 5 through the drive shaft hole 10 of the fluid inlet housing 9, so that the rotary drive shaft 7 can extend into the flow channel of the fluid inlet pipe 5. The rotary drive shaft 7 is extending through the fluid inlet housing 9 from the drive shaft hole 10 to the pipe port 24. With this construction, the rotary drive shaft 7 extends through the drive shaft hole 10 in the wall of the fluid inlet housing 9, which is in fluid communication with the fluid inlet pipe 5. As shown in FIG. 1, the fluid inlet housing is arranged at a position configured to be located below the tank 1.

A suitable drive shaft seal 11 may be arranged between the housing of the fluid inlet housing 9 and the rotary drive shaft 7 for sealing the drive shaft hole 10. The drive shaft seal 11 prevents that the fluid flowing in the fluid inlet housing 9 is leaking out from the fluid inlet housing 9 through the drive shaft hole 10. The drive shaft seal 11 can be made of any suitable material with a desired construction, such as for example a gasket made of rubber or silicone. The seal may be a mechanical type shaft seal, an O-ring type shaft seal or a magnetic coupling seal arrangement, or the like.

Since the fluid inlet pipe 5 is held in place in relation to the housing of the fluid duct 2, and firmly connected to the fluid duct 2, also the fluid inlet housing 9 is held in place in relation to the fluid duct 2, since the fluid inlet housing 9 is firmly connected to the fluid inlet pipe 9. With this construction, the fluid inlet pipe 5 may be stationary and non-rotatably arranged in relation to the tank 1.

In an alternative embodiment, the fluid handling apparatus can be constructed without the fluid inlet housing 9. Instead, the fluid inlet pipe 5 can at the lower part be provided with a curved pipe segment integrated in the pipe structure. The rotary drive shaft 7 can then instead extend through a drive shaft hole 10 in a wall of the fluid inlet pipe 5, at a position configured to be located below the tank 1. In the same way as described above, a drive shaft seal 11 may be arranged for sealing the drive shaft hole 10.

The fluid inlet pipe 5 may be composed of a plurality of individual pipe segments that are detachably interconnected to each other with suitable connection means. The portion of the fluid inlet pipe located within the tank 1 may for example comprise about 2-10, such as 3-10 individual pipe segments. The individual pipe segments may be provided with suitable seals to secure that the fluid is not leaking out between the individual pipe segments. The construction with individual pipe segments will enable a simple installation and removal of the fluid inlet pipe 5 from the tank 1 at the bottom 4 of the tank 1.

In the same way, the rotary drive shaft 7 may be composed of a plurality of individual drive shaft segments that are detachably interconnected to each other with suitable connection means. The portion of the rotary drive shaft 7 located within the tank 1 may for example comprise about 2-10, such as 3-10 individual drive shaft segments. The construction with individual drive shaft segments will enable a simple installation and removal of the rotary drive shaft 7 from the tank 1 at the bottom 4 of the tank 1.

Figure 3:
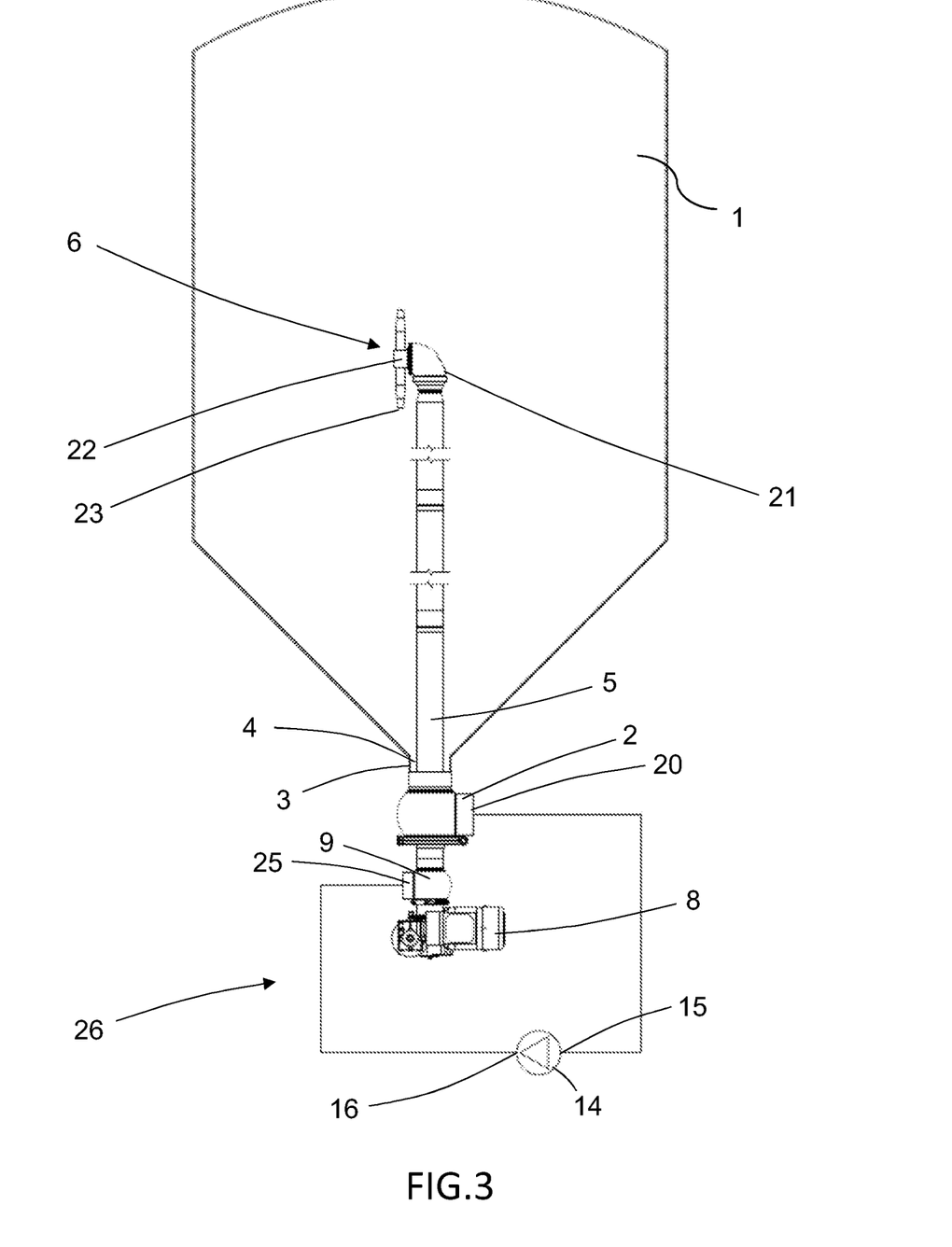
FIG. 3 shows schematically, a fluid handling apparatus with a flow scheme according to the disclosure.
Figure 4:
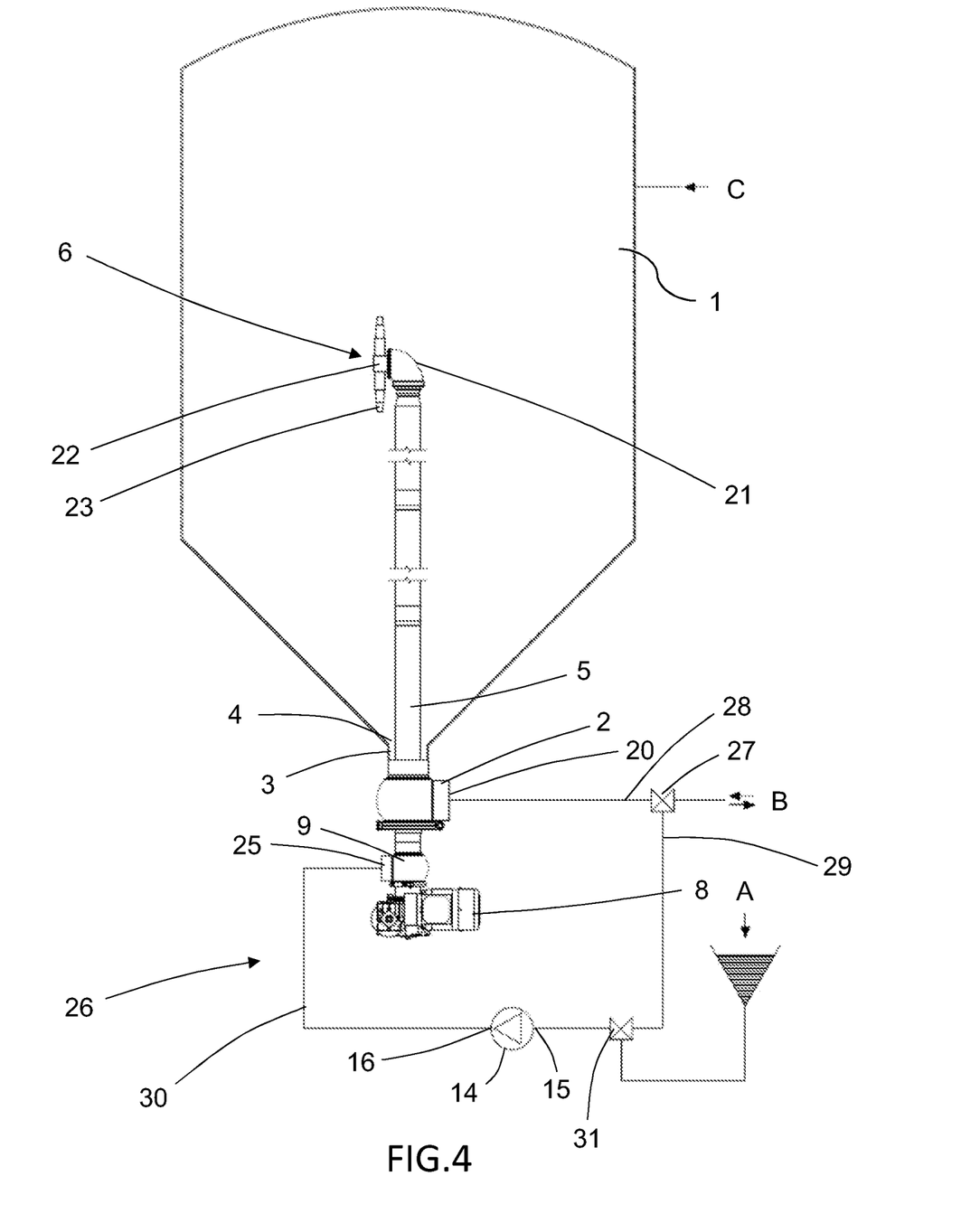
FIG. 4 shows schematically, a fluid handling apparatus with an alternative flow scheme according to the disclosure.

In FIG. 3, a circulating fluid handling system is shown, where the fluid handling apparatus further comprises a flow circuit 26 with a fluid pump 14 establishing the circulating fluid handling system. The flow circuit 26 is distributing the flow of fluid into and out from the tank 1, and the flow circuit is connected to the tank 1 and to the fluid handling apparatus for accomplishing that a flow of the fluid is ejected from the ejection nozzles 23 into the tank 1. The fluid pump 14 is arranged with a pump inlet port 15 and a pump outlet port 16. The pump outlet port 16 is in fluid communication with the fluid inlet pipe 5, and the pump 14 is arranged for pumping the fluid into the fluid inlet pipe 5 via the fluid inlet housing 9 and further to the ejection nozzles 23. As shown in FIG. 4, the pump outlet port 16 is in fluid communication with the inlet port 25 of the fluid inlet housing 9. The pump inlet port 15 is in fluid communication with the external port 20 of the fluid duct 2, so that fluid drained from the tank 1 through the fluid duct 2 can be transported to the fluid pump 14 and further distributed to the ejection nozzles 23.

The fluid handling system as shown in FIG. 3 is arranged so that the operation of the fluid pump 14 is configured for providing circulation of fluid in the fluid handling apparatus. The circulation of fluid according to this operation can be used for cleaning of the tank 1 or for mixing the fluid in the tank 1 with for example a substance.

A fluid may be filled into the tank from any source of fluid (not shown in FIG. 3) used in the process. For example, the fluid pump 14 can be used for introducing the fluid into the tank 1 via the ejection nozzles 23. Alternatively, the fluid may be filled into the tank 1 via the fluid duct 2 before circulation of the fluid is started. In another alternative embodiment, the tank 1 may be provided with a separate filling port for filling the fluid into the tank 1.

In FIG. 4, a fluid handling system is shown where the system can be used for filling the tank 1, emptying the tank 1, circulating the fluid, and mixing the fluid with a substance. Also in this embodiment, the fluid handling apparatus further comprises a flow circuit 26 with a fluid pump 14. The flow circuit 26 is distributing the flow of fluid into and out from the tank 1, and the flow circuit is connected to the tank 1 and to the fluid handling apparatus for accomplishing that a flow of the fluid may be ejected from the ejection nozzles 23 into the tank 1.

The fluid pump 14 is arranged with a pump inlet port 15 and a pump outlet port 16. The pump outlet port 16 is in fluid communication with the fluid inlet pipe 5, and the pump 14 is arranged for pumping the fluid into the fluid inlet pipe 5 via the fluid inlet housing 9 and further to the ejection nozzles 23. As shown in FIG. 4, the pump outlet port 16 is in fluid communication with the inlet port 25 of the fluid inlet housing 9. The pump inlet port 15 is in fluid communication with the external port 20 of the fluid duct 2.

The system shown in FIG. 4 comprises a first valve 27 arranged between the external port 20 of the fluid duct 2 and the pump inlet port 16, and the first valve 27 can be used for controlling the flow between the fluid duct 2 and the fluid pump 14. The first valve 27 is further connected to a fluid source B, from which the fluid can be fed to the tank 1. The first valve 27 may be of any suitable type known in the art depending on the type of fluid used, which can regulate the flow between three flow conduits, such as a three way valve.

In a first state, the first valve 27 can be set to allow the flow of fluid from the fluid source B into the tank 1. This first state can be used for filling the tank with fluid from the fluid source B, which may be pressurized, to the tank 1 via a first conduit 28 to the fluid duct 2. When the tank 1 has been filled with the fluid to a desired level, the valve 27 can be closed to prevent further filling of the tank 1.

In a second state, the first valve 27 can be set to allow the flow of fluid from the fluid source B, which may be pressurized, into the tank 1, via both the fluid duct 2 and the ejection nozzles 23. The first valve 27 will in this second state allow the fluid to flow from the fluid source B to the tank 1 via the first conduit 28 to the fluid duct 2, and also via a second conduit 29 to the fluid pump 14 that will pump the fluid through a third conduit 30 into the fluid inlet pipe 5 to the ejection nozzles 23. In the second state, the fluid pump 14 is operated, and may provide a faster filling operation of the tank 1. When the tank 1 has been filled with the fluid to a desired level, the valve 27 can be closed to prevent further filling of the tank 1. The first conduit 28, the second conduit 29 and the third conduit 30 may be of any suitable construction, such as a hose or pipe connecting the different components of the fluid handling system. The hose or pipe may be made of any suitable material, such as for example plastic materials, reinforced plastic materials, rubber, silicone, stainless steel, copper, or other metallic materials, depending on the use.

In a third state, the first valve 27 can be set to allow the fluid to flow out from the tank 1, through the first conduit 28, and further to the second conduit 29 to the fluid pump 14. The fluid pump 14 is operated to pump the fluid through the third conduit 30 into the fluid inlet pipe to the elector nozzles 23. This third state is similar to the circulation of fluid described in relation to FIG. 3, and the fluid is pumped from the tank 1 through the fluid duct 2 with the fluid pump 14, and further distributed to the ejection nozzles 23. Before the circulation operation, the tank 1 can be filled with fluid as described above.

To introduce a substance into the system from a substance source A, a second valve unit 28 can be arranged between the first valve 27 and the fluid pump 14, as shown in FIG. 4. The second valve unit 28 can operate so that the substance is prevented from being entered into the system. The second valve unit 28 can also be set to allow the substance to be introduced into the system from the substance source B, so that the substance is introduced into the fluid flow before the fluid pump 14 and pumped by the fluid pump 14 to the ejection nozzles 23, where the substance is introduced into the tank 1. As an alternative, the substance may be introduced directly into the tank 1 from another substance source C as illustrated in FIG. 4.

The fluid pump 14 may for example be a gear pump, a centrifugal pump, or a pump of another suitable type. The first valve 27 and the second valve 28 may be butterfly valves, globe valves or valves of another suitable type. A fluid from the fluid source B is typically a liquid to be mixed in the tank 1 or a cleaning liquid introduced in the tank 1. Additional liquid sources, like for example a second source of liquid may be connected to the tank 1, as required by a predetermined mixing or cleaning application. The substance introduced may for example be solid particles that are mixed with the fluid. Also cleaning granules or other cleaning agents may be introduced into the system if cleaning the tank 1.

As described above, the fluid handling apparatus is suitable for introduction and/or circulation of solid particles. In particular solid hops material may be introduced into a fluid content of the tank 1, such as for example beer or wort in a beer making process. The fluid handling apparatus and system can thus be used for mixing beer or wort with solid hops material in the tank 1. The fluid handling apparatus as described in the different embodiments above will provide a compact solution with an efficient mixing of the beer or wort with the solid hops material without risking the system is clogged with the introduced solid hops material. Further, the fluid handling apparatus can be driven by an external power source, which gives fewer components inside the fluid handling apparatus, and since no turbine is used for driving the rotary head housing of the fluid handling apparatus, more clearance inside the equipment can be achieved. The rotational power can be increased with the external power source so that particles are churned instead of stopping the rotary fluid ejection device. The solid hops material may be hops pellets or whole hops, such as whole fresh hops. In particular the solid hops material may be hops pellets.

With reference to the system described in relation to FIG. 4, the beer or wort may be introduced into the tank from the fluid source B, via the first valve unit 27, and the solid hops material may be introduced into the beer or wort from the substance source A arranged outside the tank 1, via the second valve unit 31. Alternatively, the beer or wort may be circulated through the system particularly including the tank 1, the fluid duct 2, the first conduit 28, the second conduit 29, the fluid pump 14, the third conduit 30, the fluid inlet pipe 5 and the ejection nozzles 23, and the solid hops material may be introduced into the beer or wort from the substance source A arranged outside the tank 1, via the second valve unit 31. In these cases, the solid hops material is introduced into the beer or wort outside the tank 1.

Alternatively, or if further solid hops material needs to be introduced into the system, substance source C may be used, which substance source C also is arranged outside the tank 1 and connected to the tank via an additional tank opening. The additional tank opening is preferably located at an upper region of the tank 1 for enabling easy filling of for example solid substance particles also when the tank is filled with fluid. In this case, the solid hops material is introduced into the beer or wort inside the tank 1.

The beer or wort mixed with solid hops material is ejected within the tank 1 by means of the rotary fluid ejection device 6, which is connected to the fluid inlet pipe 5. The rotary fluid ejection device 6 is rotated by the means of the rotary drive shaft 7 that extends at least partly inside the fluid inlet pipe 5, and the rotary drive shaft is rotatably connected with the rotary fluid ejection device 6, as described above. The beer or wort mixed with solid hops material is drained from the tank 1 by means of the fluid duct 2, which is in fluid communication with the tank opening 3 at the bottom 4 of the tank 1, and the fluid inlet pipe 5 extends at least partly through the fluid duct 2 and through the tank opening 3 into the tank 1.

The fluid handling apparatus may comprise a processing unit for controlling the external power source 8 and the other components of the fluid handling apparatus, such as the fluid pump 14 and the valves 27, 31. The processing unit may have a central processing unit (CPU) that is connected to and controls an input/output device. The CPU may be a central processing unit or microprocessor of a conventional type and represents the portion of the processing unit that is capable of carrying out instructions of a computer program, and may be the primary element carrying out the functions of the processing unit.

Figure 5:
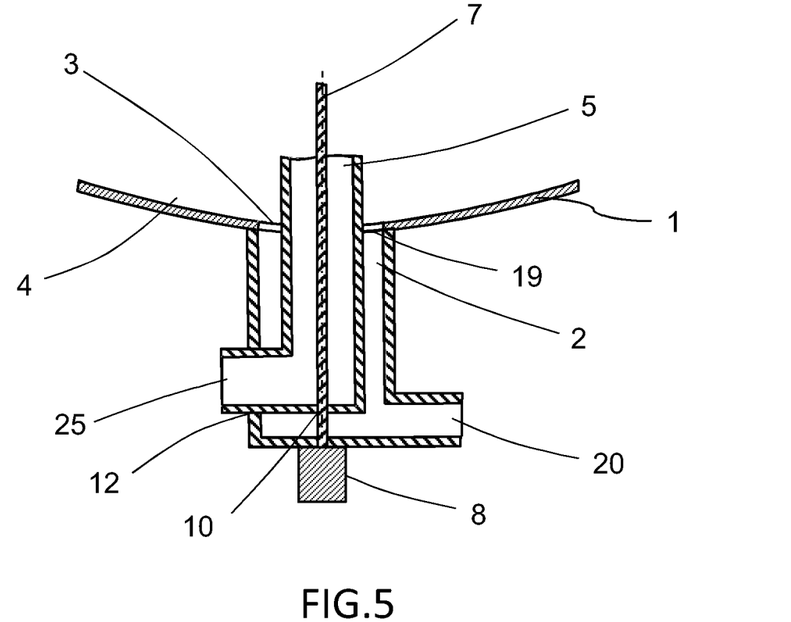
FIG. 5 shows schematically, a cross-section of a lower part of the fluid handling apparatus according to another embodiment of the disclosure.

In FIG. 5, an alternative embodiment of the fluid handling apparatus is shown. In this embodiment the fluid duct 2 is arranged as a housing with a tank port 19 and an external port 20. The tank port 19 is connected to the tank 1 at the tank opening 3 arranged at the bottom 4 of the tank 1. The external port 20 is arranged at the lower part of the fluid duct 2 at an angle in relation to the tank port 19, as shown in FIG. 5, so that the fluid is changing direction in the fluid duct 2 when flowing out from or into the tank 1. The fluid inlet pipe 5 has a lower part with an inlet port 25 arranged at an angle in relation to the upper part of the fluid inlet pipe 5, as shown in FIG. 5. The lower part of the fluid inlet pipe 5 is thus bent or curved in relation to the upper part of the fluid inlet pipe 5. As shown in FIG. 5, a pipe hole 12 is arranged in the side wall of the fluid duct, so that the fluid inlet pipe 5 is running inside the fluid duct 2 from the pipe hole 12 to the tank port 19 and further into the tank 1. This embodiment thus shows a design where both the fluid duct 2 and the fluid inlet pipe 5 are integrated in a single housing.

The tank hole 12 may be provided with a suitable sealing so that the fluid is not leaking out through the pipe hole 12. The rotary drive shaft 7 is arranged inside the fluid inlet pipe 5. A drive shaft hole 10 is arranged in the lower wall of the fluid inlet pipe 5. With this construction, the rotary drive shaft 7 can be connected to an external power source 8 and extend through the drive shaft hole 10. Moreover, the external power source 8 may for example be attached to an external surface of the fluid duct 2.

Figure 6:
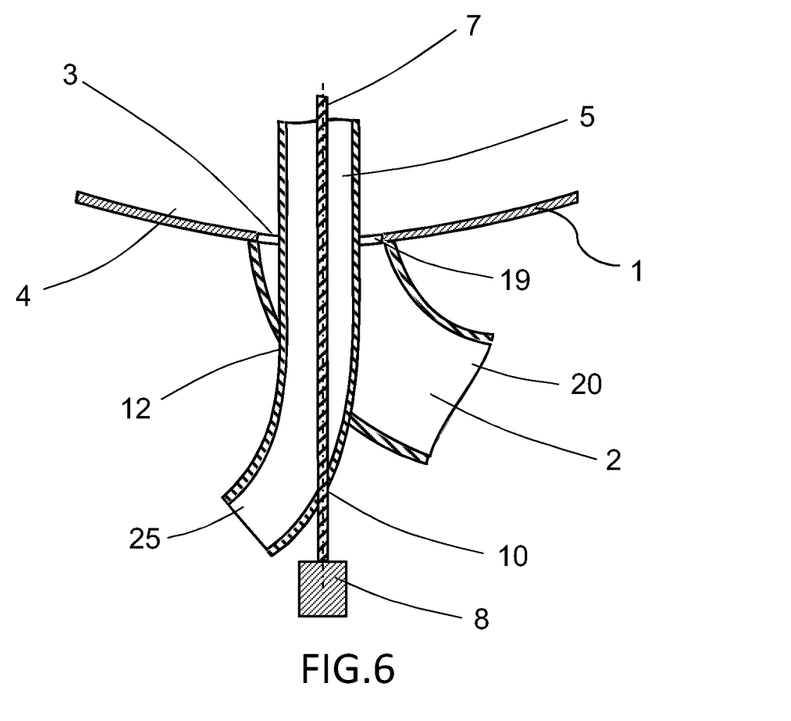
FIG. 6 shows schematically, a cross-section of a lower part of the fluid handling apparatus according to another embodiment of the disclosure.

In FIG. 6, a further alternative embodiment of the fluid handling apparatus is shown, with a construction similar to the embodiment described in relation to FIGS. 1 and 2. In this embodiment the fluid duct 2 is arranged as a pipe with a tank port 19 and an external port 20. The tank port 19 is connected to the tank 1 at the tank opening 3 arranged at the bottom 4 of the tank 1. The external port 20 is arranged at the lower part of the fluid duct 2 at an angle in relation to the tank port 19, as shown in FIG. 6, so that the fluid is changing direction in the fluid duct when flowing out from or into the tank 1. In this embodiment, the fluid duct 2 is configured as a pipe structure having a slightly bent or curved shape. The fluid duct 2 may be composed of a single piping part or multiple interconnected piping parts.

The fluid inlet pipe 5 has a lower part with an inlet port 25 arranged at an angle in relation to the extension of the fluid inlet pipe 5, as shown in FIG. 5. The lower part of the fluid inlet pipe 5 is slightly bent or curved in relation to the upper part of the fluid inlet pipe 5. The fluid inlet pipe 5 may be composed of a single piping part or multiple interconnected piping parts.

As shown in FIG. 5, a pipe hole 12 is arranged in the side wall of the fluid duct 2, so that the fluid inlet pipe 5 is running inside the fluid duct 2 from the pipe hole 12 to the tank port 19 and further into the tank 1. The pipe hole 12 may be provided with a suitable sealing so that the fluid is not leaking out through the pipe hole 12. A rotary drive shaft 7 is arranged inside the fluid inlet pipe 5. A drive shaft hole 10 is arranged in the wall of the fluid inlet pipe 5. With this construction, the rotary drive shaft 7 can be connected to an external power source 8 and extend through the drive shaft hole 10. Moreover, the external power source 8 may for example be attached to an external surface of the attached to the fluid inlet pipe 5.

A further advantageous aspect of the disclosure is hereinafter described with reference to FIG. 7*a*. Operation of the fluid circulation apparatus with solid particles mixed in the fluid, in particular solid hops material such as hops pellets, may result in clogging of various parts of the fluid circulation apparatus. For example, solid particles sinking down towards the bottom of the tank 1 may cause clogging of the fluid duct and tank opening 3, but also other part of the fluid circulation apparatus may become clogged. Clogging, or blocking, typically results in reduced flow capacity of the fluid circulation apparatus or even a total stop in the flow circulation. Conventionally clogging typically requires costly and time consuming disassembly of the selected parts of fluid circulation apparatus. This problem can be at least partly solved by providing the fluid circulation apparatus with a fluid reversing valve arrangement 32, which is configured to enable selective flow circulation operation of the fluid handling apparatus in either conventional mixing/cleaning mode or a reverse mode. The fluid pump 14 can always be operated in the same direction, i.e. always sucking in fluid at a pump inlet port 15 and discharging pressurised fluid at the pump outlet port 16.

A CPU of the fluid handling apparatus may for example be programmed to automatically operate the fluid handling apparatus in reverse mode. The reverse mode may be operated periodically or upon detection of indication of clogging. The reverse mode may also be controlled manually.

During operation of the fluid handling apparatus in reverse mode fluid is configured to be sucked out from the tank 1 via the rotary fluid ejection device 6 and supplied to the tank 1 via the fluid duct 2. This may result in effective declogging because the fluid within the tank in the region of the rotary fluid ejection device 6 may have much less solid particles than the bottom region of the tank 1. Hence, fluid sucked in by the rotary fluid ejection device 6 may be possible even if the fluid duct 2 is clogged, and any blocking in the fluid duct 2 may be eliminated by supplying pressurised fluid from the fluid pump 14 to the fluid duct 2.

Figure 7A:
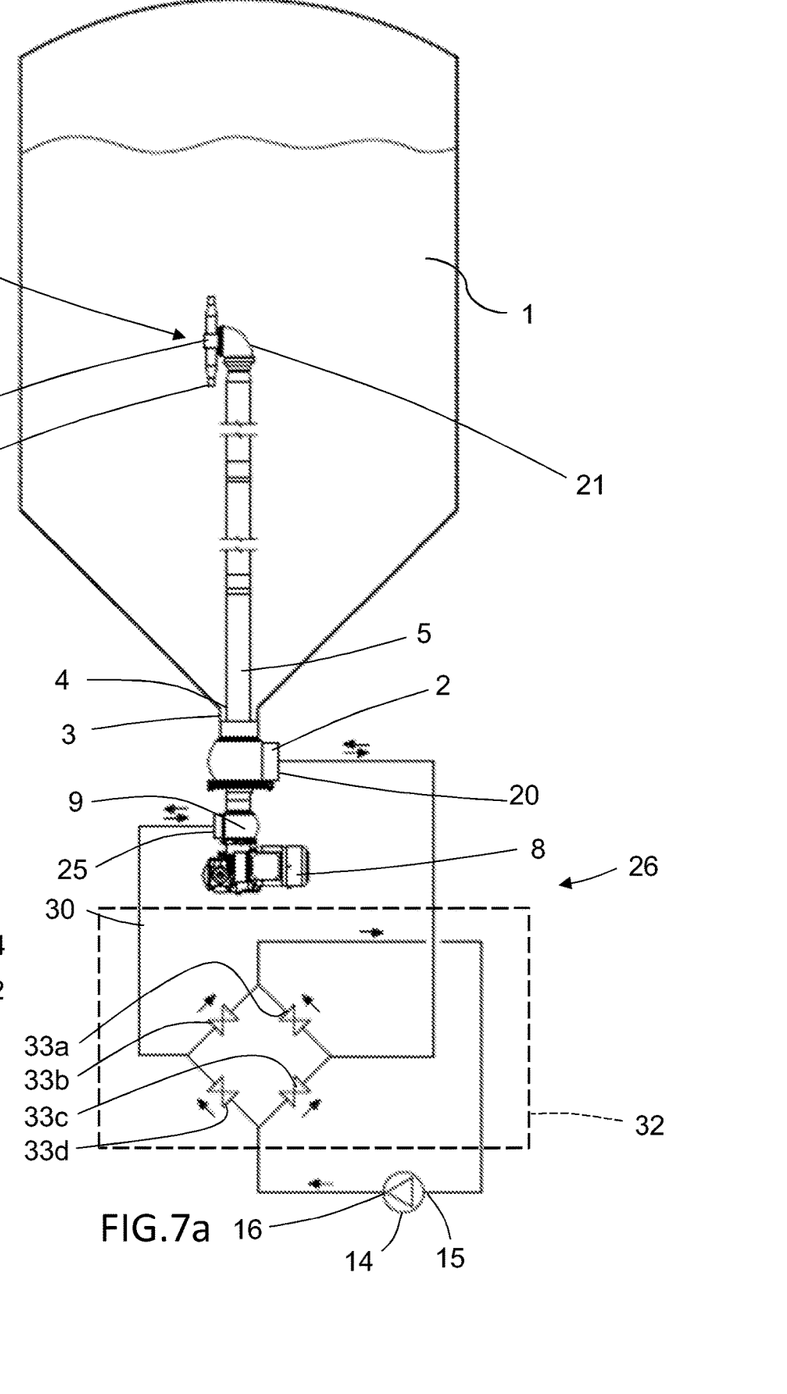
FIG. 7a shows schematically, a fluid handling apparatus with a fluid reversing valve arrangement according to the disclosure.
Figure 7B:
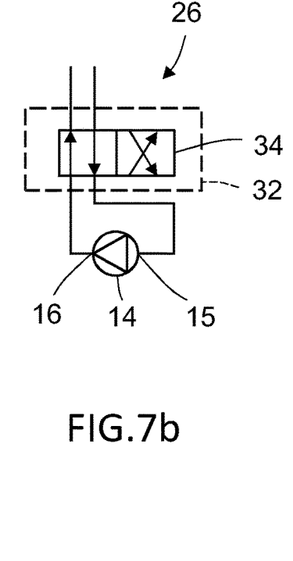
FIG. 7b shows schematically alternative embodiments of the fluid reversing valve arrangement according to the disclosure.

FIG. 7a illustrates schematically an example embodiment of the fluid reversing valve arrangement 32 fluidly connected to the pump inlet port 15, the pump outlet port 16, the fluid duct 2 and the fluid inlet pipe 5. The fluid reversing valve arrangement 32 is thus arranged between the fluid pump 14 and the tank 1.

The fluid reversing valve arrangement 32 comprises a third valve unit 33a, a fourth valve unit 33b, a fifth valve unit 33c and a sixth valve unit 33d. The third to sixth valves units 33a-33d are connected to each other to form a schematic circle, and the pump inlet port 15 and pump outlet port 16 are fluidly connected to the circle at opposite sides, and the fluid duct 2 and the fluid inlet pipe 5 are also fluidly connected to the circle at opposite sides but displaced from the connections of the pump inlet port 15 and pump outlet port 16 by one valve unit 33a-33d.

Flow circulation operation in conventional mixing/cleaning mode involves having fluid ejected into the tank 1 via the rotary fluid ejection device 6 and drained from the tank 1 via the fluid duct 2. In this mode the third and sixth valve units 33a, 33d are in open state and the fourth and fifth valves units 33b, 33c are in closed state. Fluid from the fluid pump outlet port 16 passes the sixth valve unit 33d and enters the fluid inlet pipe 5, and fluid drained via the fluid duct 2 passes the third valve unit 33a and is supplied at the fluid pump inlet port 15.

Flow circulation operation in reverse mode involves having fluid being sucked out from the tank 1 via the rotary fluid ejection device 6 and supplied to the tank 1 via the fluid duct 2. In this mode the third and sixth valve units 33a, 33d are in closed state and the fourth and fifth valves units 33b, 33c are in opened state. Fluid from the fluid pump outlet port 16 passes the fifth valve unit 33c and enters the fluid duct 2, and fluid sucked out from the tank 1 via the rotary fluid ejection device 6 and the fluid inlet pipe 5 passes the fourth valve unit 33b and is supplied at the fluid pump inlet port 15.

The embodiment of the fluid reversing valve arrangement 32 disclosed in FIG. 7a is merely one example. The third to sixth valve units 33a-33d may for example be more integrated and FIG. 7a illustrates schematically a flow circuit having the fluid pump 14 and fluid reversing valve arrangement 32 symbolised by means of a conventional 4/2 directional control valve. The tank 1, fluid duct 2 and fluid inlet pipe 5 are not showed.

The concept of providing the fluid circulation apparatus with a fluid reversing valve arrangement for the purpose of solving the problem of clogging is not strictly limited to a fluid handling and circulation apparatus according to the present disclosure, i.e. to a fluid handling or circulation apparatus having the fluid inlet pipe extending through the fluid duct and through the tank opening into the tank, but may equally be provided to a more conventional fluid circulation apparatuses, such as for example those having a rotating head housing that is driven by a turbine, which in turn is driven by the liquid flow to the tank, or those where fluid is supplied to the tank at a first tank opening at an upper or top region of the tank and fluid is drained from the tank at a second tank opening at a lower or bottom region of the tank. Such conventional fluid handling or circulation apparatuses typically include a rotary fluid ejection device having a rotary head with a rotary head housing that is rotatable around a first axis and a rotary hub on which at least one fluid ejection nozzles are arranged, and which rotary hub is rotatable relatively the rotary head housing about a second axis that is typically offset from the first axis by an angle of 80-100°, such as 90°. However, the fluid reversing valve arrangement is preferably combined with a fluid handling apparatus according to the present disclosure, i.e. to a fluid handling apparatus as described above and defined by the claims.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Tank
2: Fluid duct
3: Tank opening
4: Bottom
5: Fluid inlet pipe
6: Rotary fluid ejection device
7: Rotary drive shaft
8: External power source
9: Fluid inlet housing
10: Drive shaft hole
11: Drive shaft seal
12: Pipe hole
13: Pipe seal
14: Fluid pump
15: Pump inlet port
16: Pump outlet port
17: Upper part
18: Lower part
19: Tank port
20: External port
21: Rotary head housing
22: Rotary hub
23: Ejection nozzles
24: Pipe port
25: Inlet port 26: Flow circuit
27: First valve unit
28: First conduit
29: Second conduit
30: Third conduit
31: Second valve unit
32: Fluid reversing valve arrangement
33a: Third valve unit
33b: Fourth valve unit
33c: Fifth valve unit
33d: Sixth valve unit
34: 4/2 directional control valve

The invention claimed is:

1. A fluid tank system comprising:
a vertically upright tank that includes a top part and a bottom part enclosing an interior, the bottom part of the tank being positioned vertically below the top part of the tank, the bottom part of the tank including a bottom provided with an opening,
a fluid duct connected to the tank for draining fluid from the interior of the tank or for supplying fluid to the interior of the tank, the fluid duct being positioned vertically below the bottom of the tank and in fluid communication with the interior of the tank by way of the opening at the bottom of the tank;
a fluid inlet pipe that possesses an inner surface and oppositely disposed first and second ends, the fluid inlet pipe passing through the fluid duct so that the first end of the fluid inlet pipe is positioned in the interior of the tank and the second end of the fluid inlet pipe is positioned vertically below the fluid duct to receive the fluid to be supplied to the interior of the tank, the fluid inlet pipe extending continuously from the first end to the second end;
a rotary fluid ejector positioned adjacent the first end of the fluid inlet pipe and in fluid communication with the fluid inlet pipe so that fluid introduced into the second end of the fluid inlet pipe flows along the fluid inlet pipe to the first end of the fluid inlet pipe and is introduced to the rotary fluid ejector, the rotary fluid ejector including at least one ejection nozzle configured to eject the fluid flowing along the fluid inlet pipe into the tank;
a rotatable rotary drive shaft extending at least partly inside the fluid inlet pipe, the rotary drive shaft possessing an axially extending outer surface, the inner surface of the fluid inlet pipe facing the outer surface of the rotary drive shaft and being spaced from the outer surface of the rotary drive shaft so that the fluid introduced into the second end of the fluid inlet pipe flows along the fluid inlet pipe toward the first end of the fluid inlet pipe and contacts both the inner surface of the fluid inlet pipe and the outer surface of the rotary drive shaft;
the rotatable rotary drive shaft being rotatably connected to the rotary fluid ejector so that rotation of the rotary drive shaft results in rotation of the at least one ejection nozzle of the rotary fluid ejector; and
the rotary drive shaft possessing an end configured to be connected to a power source to rotate the rotary drive shaft and thereby result in rotation of the at least one ejection nozzle so that the at least one ejection nozzle ejects the fluid into the tank while the at least one ejection nozzle is rotating, the end of the rotary drive shaft being positioned vertically below the fluid duct.

2. The fluid tank system according to claim 1, further comprising:
a fluid inlet housing possessing an interior through which a portion of the rotary drive shaft passes so that the fluid inlet housing surrounds a part of the axially extending outer surface of the rotary drive shaft, the fluid inlet housing including a pipe port connected to the second end of the fluid inlet pipe so that the interior of the fluid inlet housing communicates with the fluid inlet pipe;
the fluid inlet housing including an inlet port opening into the interior of the fluid inlet housing and configured to be connected to a fluid conduit for supplying the fluid to the interior of the fluid inlet housing and to the fluid inlet pipe; and
the end of the rotary drive shaft being positioned vertically below the fluid inlet housing.

3. The fluid tank system according to claim 2, wherein the fluid inlet housing includes a wall in a lower part of the fluid inlet housing, the wall in the lower part of the fluid inlet housing including a drive shaft hole through which the rotary drive shaft passes, and including a drive shaft seal arranged between the fluid inlet housing and the rotary drive shaft to seal the drive shaft hole and prevent fluid in the fluid inlet housing from leaking to outside the fluid inlet housing through the drive shaft hole.

4. The fluid tank system according to claim 1, wherein the bottom part of the tank includes a tapering wall that tapers inwardly to converge at the opening.

5. The fluid tank system according to claim 4, wherein the top part of the tank includes a vertically extending wall that terminates at an upper end of the tapering wall, the rotary fluid ejector being positioned in the top part of the tank that is surrounded by the vertically extending wall.

6. The fluid tank system according to claim 1, wherein the fluid inlet pipe is comprised of a plurality of individual pipe segments that are detachably interconnected to enable removal of the fluid inlet pipe from the tank by way of the bottom of the tank.

7. The fluid tank system according to claim 1, wherein the rotary drive shaft is comprised of a plurality of individual drive shaft segments that are detachably interconnected to enable removal of the rotary drive shaft from the tank by way of the bottom of the tank.

8. The fluid tank system according to claim 1, wherein the rotary drive shaft and the fluid inlet pipe are coaxial with one another.

9. The fluid tank system according to claim 1, further comprising a fluid inlet housing possessing an interior through which a portion of the rotary drive shaft passes so that the fluid inlet housing surrounds a part of the axially extending outer surface of the rotary drive shaft, the interior of the fluid inlet housing being in fluid communication with an interior of the fluid inlet pipe, the fluid duct possessing a first end at which is located a tank port that is connected to the bottom of the tank, the fluid duct also possessing a second end opposite the first end of the fluid duct, the fluid inlet housing being positioned vertically below the second end of the fluid duct.

10. The fluid tank system according to claim 1, further comprising a fluid inlet housing possessing an interior through which a portion of the rotary drive shaft passes so that the fluid inlet housing surrounds a part of the axially extending outer surface of the rotary drive shaft, the interior of the fluid inlet housing being in fluid communication with an interior of the fluid inlet pipe, the rotary drive shaft possessing a first end connected to the rotary fluid ejector, the end of the rotary drive shaft that is configured to be connected to the power source being a second end of the rotary drive shaft that is opposite the first end of the rotary drive shaft, the second end of the rotary drive shaft being positioned outside the interior of both the fluid inlet housing and the fluid duct.

11. The fluid tank system according to claim 1, further comprising a fluid inlet housing possessing an interior through which a portion of the rotary drive shaft passes so that the fluid inlet housing surrounds a part of the axially extending outer surface of the rotary drive shaft, the interior of the fluid inlet housing being in fluid communication with an interior of the fluid inlet pipe, the rotary drive shaft possessing a first end connected to the rotary fluid ejector, the end of the rotary drive shaft that is configured to be connected to the power source being a second end of the rotary drive shaft that is opposite the first end of the rotary drive shaft, the second end of the rotary drive shaft being positioned vertically below the fluid duct and the fluid inlet housing.

12. A fluid tank system comprising:
   a tank that includes a top part and a bottom part enclosing an interior, the bottom part of the tank being positioned vertically below the top part of the tank, the bottom part of the tank including a bottom provided with an opening,
   a fluid duct having one end connected to the tank for draining fluid from the interior of the tank or for supplying fluid to the interior of the tank, the fluid duct being positioned vertically below the bottom of the tank and in fluid communication with the interior of the tank by way of the opening at the bottom of the tank, the fluid duct including an external port;
   a fluid inlet pipe that possesses an inner surface and oppositely disposed first and second ends, the fluid inlet pipe including an interior, the fluid inlet pipe passing through the fluid duct so that the fluid duct surrounds a portion of the fluid inlet pipe, the first end of the fluid inlet pipe being positioned in the interior of the tank, the fluid inlet pipe extending continuously from the second end to the first end;
   an inlet port for receiving fluid to be introduced into the interior of the tank, the inlet port being in fluid communication with the second end of the fluid inlet pipe so that fluid introduced into the inlet port flows through the second end of the fluid inlet pipe and into the interior of the fluid inlet pipe, the inlet port being vertically spaced from the external port;
   a rotary fluid ejector positioned adjacent the first end of the fluid inlet pipe and in fluid communication with the interior of the fluid inlet pipe so that fluid introduced into the second end of the fluid inlet pipe flows along the fluid inlet pipe to the first end of the fluid inlet pipe and is introduced to the rotary fluid ejector, the rotary fluid ejector including at least one ejection nozzle configured to eject the fluid flowing along the fluid inlet pipe into the tank;
   a rotatable rotary drive shaft extending at least partly inside the fluid inlet pipe, the rotary drive shaft possessing an axially extending outer surface, the inner surface of the fluid inlet pipe facing the outer surface of the rotary drive shaft and being spaced from the outer surface of the rotary drive shaft so that the fluid introduced into the second end of the fluid inlet pipe flows along the fluid inlet pipe toward the first end of the fluid inlet pipe and contacts both the inner surface of the fluid inlet pipe and the outer surface of the rotary drive shaft;
   the rotatable rotary drive shaft being rotatably connected to the rotary fluid ejector so that rotation of the rotary drive shaft results in rotation of the at least one ejection nozzle of the rotary fluid ejector;
   the rotary drive shaft possessing an end configured to be connected to a power source to rotate the rotary drive shaft and thereby result in rotation of the at least one ejection nozzle so that the at least one ejection nozzle ejects the fluid into the tank while the at least one ejection nozzle is rotating; and
   a flow circuit fluidly communicating the external port and the inlet port.

13. The fluid tank system according to claim 12, wherein the flow circuit includes a pump configured to pump fluid from the external port to the inlet port.

14. The fluid tank system according to claim 12, wherein the inlet port is positioned vertically below the external port.

15. The fluid tank system according to claim 12, further comprising a fluid inlet housing that includes a pipe port connected to the second end of the fluid inlet pipe, the fluid inlet housing also including an inlet port spaced from the pipe port; the fluid inlet housing possessing an interior extending between the inlet port and the pipe port, the interior of the fluid inlet housing being in fluid communication with the interior of the fluid inlet pipe by way of the pipe port.

16. The fluid tank system according to claim 15, wherein the fluid inlet housing includes a wall in a lower part of the fluid inlet housing, the wall in the lower part of the fluid inlet housing including a drive shaft hole through which the rotary drive shaft passes.

17. The fluid tank system according to claim 15, wherein the end of the rotary drive shaft that is configured to be connected to the power source is positioned vertically below the fluid inlet housing.

18. The fluid tank system according to claim 12, wherein the rotary drive shaft and the fluid inlet pipe are coaxial with one another.

* * * * *